US010407186B2

(12) United States Patent
Cuilleron et al.

(10) Patent No.: US 10,407,186 B2
(45) Date of Patent: Sep. 10, 2019

(54) METHOD AND DEVICE FOR CONTROLLING ATTITUDE OF A SPACECRAFT

(71) Applicant: AIRBUS DEFENCE AND SPACE SAS, Toulouse (FR)

(72) Inventors: Nicolas Cuilleron, Toulouse (FR); Philippe Laurens, Toulouse (FR); Valerio Moro, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 216 days.

(21) Appl. No.: 15/563,271

(22) PCT Filed: Mar. 31, 2016

(86) PCT No.: PCT/EP2016/057051
§ 371 (c)(1),
(2) Date: Sep. 29, 2017

(87) PCT Pub. No.: WO2016/156487
PCT Pub. Date: Oct. 6, 2016

(65) Prior Publication Data
US 2018/0072435 A1    Mar. 15, 2018

(30) Foreign Application Priority Data
Mar. 31, 2015    (FR) ..................... 15 52736

(51) Int. Cl.
*B64G 1/28*    (2006.01)
*B64G 1/24*    (2006.01)
*B64G 1/26*    (2006.01)

(52) U.S. Cl.
CPC .............. *B64G 1/283* (2013.01); *B64G 1/244* (2019.05); *B64G 1/26* (2013.01); *B64G 1/286* (2013.01); *B64G 2001/245* (2013.01)

(58) Field of Classification Search
CPC .......... B64G 1/283; B64G 1/26; B64G 1/286; B64G 2001/245; G05D 1/0883
(Continued)

(56) References Cited

U.S. PATENT DOCUMENTS 9,045,241 B2 * 6/2015 Caullier ................ B64G 1/288
2005/0242241 A1 * 11/2005 Peck ..................... B64G 1/285
244/165

(Continued)

FOREIGN PATENT DOCUMENTS

EP    2 690 020 A2    1/2014

OTHER PUBLICATIONS

Zhou et al, "Time-optimal reorientation for rigid satellite with reaction wheel," International Journal of Control, Oct. 10, 2012, pp. 1452-1463, vol. 95, No. 10.

*Primary Examiner* — Anne M Antonucci
*Assistant Examiner* — James E Stroud
(74) *Attorney, Agent, or Firm* — Im IP Law; C. Andrew Im; Chai Im

(57) ABSTRACT

A method of controlling the attitude of a spacecraft in spinning around itself with a non-zero total angular momentum $H_{TOT}$. The spacecraft includes a set of inertia flywheels configured to form an internal angular momentum $H_{ACT}$. The axis of the total angular momentum $H_{TOT}$ is aligned with a principal axis of inertia of the spacecraft, in the course of which the inertia flywheels are controlled to form an internal angular momentum $H_{ACT}$. The following expression, in which J is the inertia matrix of the spacecraft:

$H_{act} \times J^{-1}(H_{tot} \otimes J^{-1} H_{tot})$ is negative if the principal axis of inertia targeted is the axis of maximum inertia of the spacecraft and is positive if the principal axis inertia targeted is the axis of minimum inertia of the spacecraft.

14 Claims, 2 Drawing Sheets

(58) Field of Classification Search
USPC .......................................................... 701/13
See application file for complete search history.

(56) References Cited

U.S. PATENT DOCUMENTS

| | | | |
|---|---|---|---|
| 2009/0183951 A1* | 7/2009 | Fiala ..................... | B64G 1/285 |
| | | | 185/27 |
| 2011/0219893 A1* | 9/2011 | Fiala ..................... | B64G 1/285 |
| | | | 74/5.34 |
| 2014/0032022 A1 | 1/2014 | Caullier et al. | |
| 2016/0137318 A1* | 5/2016 | Fitz-Coy ................ | B64G 1/285 |
| | | | 244/165 |
| 2017/0183108 A1* | 6/2017 | Cilleron ................ | B64G 1/222 |

\* cited by examiner

METHOD AND DEVICE FOR CONTROLLING ATTITUDE OF A SPACECRAFT

RELATED APPLICATIONS

This application is a § 371 application from PCT/EP2016/057051 filed Mar. 31, 2016, which claims priority from French Patent Application No. 15 52736 filed Mar. 31, 2015, each of which is incorporated herein by reference in its entirety.

TECHNICAL FIELD

The present invention relates to the field of the attitude control of spacecraft, such as satellites, and relates more particularly to an attitude control method and system for a spacecraft rotating on itself with a non-zero initial total angular momentum.

"Attitude control" should be understood here to mean more particularly modifying the orientation of the spacecraft in relation to the axis of said initial total angular momentum, called "kinetic axis", that is to say aligning, in a reference frame associated with the geometry of the spacecraft, called "craft reference frame", said kinetic axis with a predetermined axis in the craft reference frame.

STATE OF THE ART

To modify the orientation of a spacecraft in relation to the kinetic axis, it is known practice:
- to stop the rotation of the spacecraft in inertial reference frame by absorbing said total angular momentum by means of inertia flywheels (reaction wheels, gyroscopic actuators),
- to place, by means of said inertia flywheels, the spacecraft in the chosen orientation in relation to the axis of said total angular momentum,
- to transfer the total angular momentum stored in the inertia flywheels to the spacecraft in the chosen orientation.

Such an approach does however presuppose that the initial total angular momentum lies within the absorption capacity of the inertia flywheels, which cannot always be guaranteed.

In particular, the initial total angular momentum, transferred to a satellite at the moment of separation with a launch vehicle of said satellite, is generally too great to be absorbed by the inertia flywheels of said satellite.

As an example, the initial total angular momentum of a satellite after launch can be of the order of 500 N·m·s to 1000 N·m·s, whereas the capacity of the inertia flywheels embedded in a satellite is generally of the order of 50 N·m·s to 100 N·m·s. Furthermore, even if the inertia flywheels were dimensioned so as to exhibit a capacity of 1000 N·m·s, particularly unfavorable separation conditions could still transfer to the satellite an initial angular momentum greater than 1000 N·m·s, outside of the absorption capacity of the inertia flywheels.

This is why, these days, the modification of the orientation of a satellite, in relation to the kinetic axis after launch, is generally preceded by a reduction of said total angular momentum by means of chemical thrusters, making it possible to bring said total angular momentum to within the absorption capacity of the inertia flywheels.

It is currently envisaged that future satellites will no longer be equipped with chemical thrusters, but only with electrical (plasma) thrusters. Now, the electrical thrusters cannot replace the chemical thrusters, to reduce the total angular momentum of a satellite after separation, as long as the electrical autonomy of said satellite is not assured. However, the electrical autonomy of the satellite can be assured only by placing said satellite in a suitable orientation.

The European patent application EP 2690020 A2 describes a method for reducing the total angular momentum of a satellite, comprising a step, prior to the reduction of the total angular momentum, of alignment of the axis of the total angular momentum with an axis of maximum or minimum inertia of the satellite. In the European patent application EP 2690020 A2, the step of alignment of the axis of the total angular momentum with the axis of maximum or minimum inertia of said satellite consists in locking the angular momentum formed by inertia flywheels of the satellite to the speed of rotation of the satellite. However, such a control of the inertia flywheels does not always make it possible to ensure a convergence of the axis of the total angular momentum with the axis of maximum or minimum inertia of said satellite, particularly in the case of low capacity inertia flywheels.

SUMMARY OF THE INVENTION

The aim of the present invention is to remedy all or some of the limitations of the prior art solutions, in particular those set out above, by proposing a solution which makes it possible to modify the orientation of a spacecraft in relation to the kinetic axis by means solely of inertia flywheels, including when said initial total angular momentum is greater than the absorption capacity of the inertia flywheels.

To this end, and according to a first aspect, the invention relates to an attitude control method for a spacecraft rotating on itself with a non-zero total angular momentum $H_{tot}$, said spacecraft comprising a set of inertia flywheels adapted to form an internal angular momentum $H_{act}$ of any axis in a craft reference frame. The attitude control method comprises a step of alignment of the axis of said total angular momentum $H_{tot}$ with a principal axis of inertia of the spacecraft, during which the inertia flywheels are controlled so as to form an internal angular momentum $H_{act}$ such that the following expression:

$$H_{act} \times J^{-1}(H_{tot} \otimes J^{-1} H_{tot})$$

- is negative throughout the duration of the step of alignment with the principal axis of inertia if said targeted principal axis of inertia is the axis of maximum inertia of the spacecraft,
- is positive throughout the duration of the step of alignment with the principal axis of inertia if said targeted principal axis of inertia is the axis of minimum inertia of the spacecraft, expression in which J is the inertia matrix of the spacecraft in craft reference frame, the operator × is the scalar product between two vectors and the operator ⊗ is the vector product between two vectors.

In fact, the inventors have found that such arrangements make it possible always to align the axis of the total angular momentum with the targeted principal axis of inertia (either the axis of maximum inertia or the axis of minimum inertia). In the case where the targeted principal axis of inertia is the axis of maximum inertia, such arrangements also make it possible to significantly speed up the convergence compared to the case in which no control is performed (a spacecraft subject to a non-zero total angular momentum having, because of internal energy dissipations and in the absence of control, a tendency to converge slowly toward an orientation in which the axis of said total angular momentum is aligned with the axis of maximum inertia).

Furthermore, the sign of the expression $H_{act} \times J^{-1}(H_{tot} \otimes J^{-1} H_{tot})$ is entirely determined by the line and the direction of the internal angular momentum $H_{act}$, and is independent of the modulus of said internal angular momentum $H_{act}$. Consequently, the attitude control method that is the subject of the invention can be implemented, including when the initial total angular momentum $H_{tot}$ is greater than the absorption capacity of the inertia flywheels of the spacecraft. In other words, it is always possible to ensure that the internal angular momentum $H_{act}$ complies with the maximum angular momentum storage capacity of the inertia flywheels and the maximum torque formation capacity of the inertia flywheels.

In particular implementations, the attitude control method can further comprise one or more of the following features, taken alone or according to all technically possible combinations.

In particular implementations, the inertia flywheels are controlled so as to form an internal angular momentum $H_{act}$ for which an angle θ between said internal angular momentum $H_{act}$ and the vector $J^{-1}(H_{tot} \otimes J^{-1} H_{tot})$ bears out, throughout the duration of the step of alignment with the principal axis of inertia, the following expression:

$$|\cos \theta| > 0.9$$

Such arrangements make it possible to significantly speed up the convergence toward the targeted principal axis of inertia, given that the line of the vector $J^{-1}(H_{tot} \otimes J^{-1} H_{tot})$ is the optimum line to have the fastest convergence toward the targeted principal axis of inertia.

In particular implementations, the inertia flywheels are controlled, throughout the duration of the step of alignment with the principal axis of inertia, so as to form an internal angular momentum $H_{act}$:

$$H_{act} = K_V U$$

expression in which $K_V$ is a scalar parameter that is negative if the targeted principal axis of inertia is the axis of maximum inertia of the spacecraft or positive if said targeted principal axis of inertia is the axis of minimum inertia of said spacecraft, and U corresponds to the unitary vector:

$$U = \frac{J^{-1}(H_{tot} \otimes J^{-1} H_{tot})}{\|J^{-1}(H_{tot} \otimes J^{-1} H_{tot})\|}$$

In particular implementations, the attitude control method comprises, after the step of alignment with the principal axis of inertia, a step of alignment with a predetermined axis X in the craft reference frame, during which the inertia flywheels are controlled so as to lock the components of the internal angular momentum $H_{act}$ according to the axes Y, Z, transverse to the axis X, on to setpoints respectively $h_Y$ and $h_Z$ determined as a function of the components of the speed of rotation of the spacecraft according to said axes Y, Z:
  the setpoint $h_Y$ of the internal angular momentum $H_{act}$ according to the axis Y is determined according to a control law of proportional-integral type from the component r of the speed of rotation according to the axis Z,
  the setpoint $h_Z$ of the internal angular momentum $H_{act}$ according to the axis Z is determined according to a control law of proportional-integral type from the component q of the speed of rotation according to the axis Y.

Such arrangements make it possible to reduce the possible mutation of the spacecraft about the targeted principal axis of inertia. In effect, the control law of the inertia flywheels during the step of alignment with the principal axis of inertia is nonlinear makes it possible to align the kinetic axis with the axis of maximum inertia or with the axis of minimum inertia regardless of the angular momentum and torque forming capacity of the inertia flywheels of the spacecraft. However, the vector $J^{-1}(H_{tot} \otimes J^{-1} H_{tot})$ tends toward zero on approaching the targeted principal axis of inertia, such that any error concerning the knowledge of the inertia matrix J can be reflected by a residual mutation about said targeted principal axis of inertia. The control law of proportional-integral type, which is linear, makes it possible to ensure the convergence toward an axis X, close to (within the limit of the capacity of the inertia flywheels) or coinciding with the targeted principal axis of inertia, and to damp the mutation to a zero value about said axis X.

In particular implementations, the setpoints $h_Y$ and $h_Z$ of the internal angular momentum $H_{act}$ according to the axes respectively Y and Z are linked to the components respectively r and q of the speed of rotation of the spacecraft by the following transfer functions, expressed in the Laplace domain:

$$\begin{cases} h_Y = K_Z\left(1 + \frac{\omega_Z}{s}\right)r \\ h_Z = -K_Y\left(1 + \frac{\omega_Y}{s}\right)q \end{cases}$$

expressions in which:
  s is the Laplace variable,
  $K_Y$ and $K_Z$ are scalar parameters of the same sign that are constant over time,
  $\omega_Y$ and $\omega_Z$ are positive scalar parameters that are constant over time.

In particular implementations, the step of alignment with the axis X is executed with total angular momentum $H_{tot}$ that is constant in inertial reference frame.

In particular implementations, the step of alignment with the principal axis of inertia is executed with total angular momentum $H_{tot}$ that is constant in inertial reference frame.

In particular implementations, the attitude control method comprises, after the step of alignment with the principal axis of inertia, a step of modification of the total angular momentum $H_{tot}$ in inertial reference frame by means of thrusters of the spacecraft.

In particular implementations, the step of alignment with the principal axis of inertia is executed before any modification of the total angular momentum $H_{tot}$ in inertial reference frame.

According to a second aspect, the invention relates to a computer program product comprising a set of program code instructions which, when they are executed by a processor, implement an attitude control method according to any one of the implementations of the invention.

According to a third aspect, the invention relates to an attitude control system for a spacecraft rotating on itself with a non-zero total angular momentum $H_{tot}$, said spacecraft comprising a set of inertia flywheels adapted to form an internal angular momentum $H_{act}$ of any axis in a craft reference frame, said attitude control system comprising means configured to implement an attitude control method according to any one of the implementations of the invention.

DESCRIPTION OF THE FIGURES

The invention will be better understood on reading the following description, given as a nonlimiting example, and with reference to the Figures which represent.

In these Figures, references that are identical from one Figure to another denote identical or similar elements. For reasons of clarity of the Figures, the elements represented are not necessarily to scale, unless otherwise stipulated.

DETAILED DESCRIPTION OF EMBODIMENTS

The present invention relates to the attitude control of a spacecraft rotating on itself with a non-zero initial total angular momentum $H_{tot}$. The axis of the total angular momentum $H_{tot}$ is hereinafter designated "kinetic axis".

"Attitude control" should be understood here to mean modifying at least the orientation of the spacecraft in relation to the kinetic axis, that is to say aligning, in a reference frame associated with the geometry of the spacecraft, called "craft reference frame", said kinetic axis with a predetermined axis in the craft reference frame.

Hereinafter in the description, the case where the spacecraft is a satellite 10 and where the initial total angular momentum $H_{tot}$ corresponds to the angular momentum transferred to said satellite 10 upon separation with a launch vehicle of said satellite is considered in a nonlimiting manner. For example, the satellite 10 has been placed in GTO (geostationary transfer orbit) by the launch vehicle and is intended to perform its mission in GEO (geostationary orbit).

There is nothing however to preclude, according to other examples, considering other types of spacecraft (space shuttle, probe, etc.). Furthermore, the invention is applicable more generally to any spacecraft for which there is a desire to modify the orientation of the kinetic axis in craft reference frame and regardless of the current or final orbit of said spacecraft (LEO, or low Earth orbit, MEO or medium Earth orbit, GTO, GEO, etc.).

Figure 1:
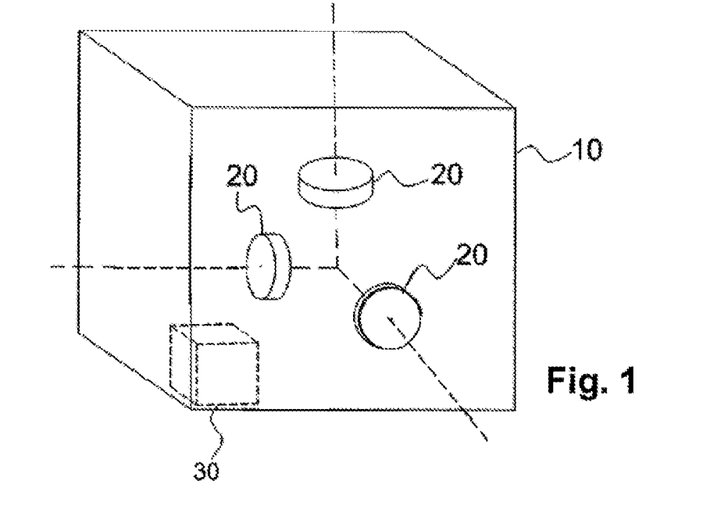
FIG. 1: a schematic representation of a satellite comprising an attitude control system.

FIG. 1 represents a particular embodiment of a satellite 10 comprising an attitude control system. In practice, the attitude control system can also comprise elements other than those represented in FIG. 1, which lie outside the scope of the invention.

In the nonlimiting example illustrated by FIG. 1, the attitude control system comprises a set of inertia flywheels 20 adapted to form an internal angular momentum $H_{act}$ of any axis in craft reference frame. As illustrated by FIG. 1, the attitude control system comprises, for example, at least three inertia flywheels 20, such as reaction wheels and/or gyroscopic actuators, adapted to form an internal angular momentum $H_{act}$ of any axis in craft reference frame. For example, the attitude control system comprises three reaction wheels with linearly independent respective unitary vector axes.

The attitude control system of the satellite 10 also comprises a control device 30. The control device 30 controls the attitude of the satellite 10 and, to this end, controls in particular the inertia flywheels 20.

The control device 30 comprises, for example, at least one processor and at least one electronic memory in which a computer program product is stored in the form of a set of program code instructions to be executed to implement the different steps of a method 50 for controlling attitude of the satellite 10. In a variant, the control device 30 also comprises one or more programmable logic circuits, of FPGA, PLD or similar type, and/or custom integrated circuits (ASIC) adapted to implement all or some of said steps of the method 50 for controlling attitude of the satellite 10. In other words, the control device 30 comprises a set of means configured by software (specific computer program product) and/or hardware (FPGA, PLD, ASIC, etc.) to implement the different steps of an attitude control method 50 described hereinbelow.

In the example illustrated by FIG. 1, the control device 30 is embedded in the satellite 10. More generally, the control device 30 can be embedded in the satellite 10 or in one or more equipment items remote from said satellite 10, in particular terrestrial equipment items (the inertia flywheels 20 being, if necessary, remotely controlled). There is also nothing to preclude, according to other examples, having a control device 30 distributed between the satellite 10 and one or more other equipment items remote from said satellite 10. In the case where the control device 30 is at least partially embedded in an equipment item remote from the satellite 10, said remote equipment item and the satellite 10 include respective conventional remote communication means.

In principle, an attitude control method 50 according to the invention mainly comprises a step 52 of alignment of the axis of said total angular momentum $H_{tot}$ with a principal axis of inertia of the satellite 10, which sets a nonlinear control law. The targeted principal axis of inertia is either the axis of maximum inertia ("flat spin") of the satellite 10, or the axis of minimum inertia of said satellite 10.

During the step 52 of alignment with the principal axis of inertia, the control device 30 drives the inertia flywheels 20 so as to form an internal angular momentum $H_{act}$ such that the following expression:

$$H_{act} \times J^{-1}(H_{tot} \otimes J^{-1} H_{tot})$$

is of constant sign throughout the duration of said step 52 of alignment with the principal axis of inertia.

In the preceding expression, J is the inertia matrix of the satellite 10 in craft reference frame, the operator × is the scalar product between two vectors and the operator ⊗ is the vector product between two vectors. More particularly, the inertia flywheels 20 are controlled such that the preceding expression:

is negative throughout the duration of the step 52 of alignment with the principal axis of inertia if said targeted principal axis of inertia is the axis of maximum inertia of the satellite 10,
  is positive throughout the duration of the step 52 of alignment with the principal axis of inertia if said targeted principal axis of inertia is the axis of minimum inertia of the satellite 10.

The sign of the expression $H_{act} \times J^{-1}(H_{tot} \otimes J^{-1} H_{tot})$ is entirely determined by the line and the direction of the internal angular momentum $H_{act}$, and is independent of the modulus of said internal angular momentum $H_{act}$. Consequently, the attitude control method 50 can be implemented including when the initial total angular momentum $H_{tot}$ is greater than the absorption capacity of the inertia flywheels of the spacecraft. In other words, it is always possible to ensure that the internal angular momentum $H_{act}$, to be formed during the step 52 of alignment with the principal axis of inertia, complies with the maximum angular momentum and torque forming capacity of the inertia flywheels 20.

The attitude control system comprises, for example, a measurement device (not represented in the Figures) suitable for measuring the inertial speed of rotation of the satellite 10, from which the control device 30 can determine, in a conventional manner, the initial total angular momentum $H_{tot}$ of the satellite 10.

Next, the control device 30 determines, for example, the components of the total angular momentum $H_{tot}$ in the craft reference frame at the instant considered, and deduces therefrom the conditions that the internal angular momentum $H_{act}$ to be formed must satisfy to ensure that the sign of the expression $H_{act} \times J^{-1}(H_{tot} \otimes J^{-1} H_{tot})$ is negative if the targeted principal axis of inertia is the axis of maximum inertia, and positive if the targeted principal axis of inertia is the axis of minimum inertia. The control device 30 then determines a suitable setpoint of internal angular momentum $H_{act}$, and a corresponding control of torque to be formed by said inertia flywheels 20 to obtain said setpoint of the internal angular momentum $H_{act}$. The real value of the internal angular momentum $H_{act}$ is for example determined by means of measurements of the respective speeds of rotation of the inertia flywheels 20, and the deviation between the real value and the setpoint of the internal angular momentum $H_{act}$ is for example used, conventionally, to update the controls of torque to be formed by said inertia flywheels 20. These various steps are iterated over time in order to take account of the rotation of the satellite 10 (and of the variations of the components of the total angular momentum $H_{tot}$ in the craft reference frame) to ensure that the sign of the expression $H_{act} \times J^{-1}(H_{tot} \otimes J^{-1} H_{tot})$ remains constant throughout the duration of the step 52 of alignment of the kinetic axis with the targeted principal axis of inertia.

As indicated previously, the line of the vector $J^{-1}(H_{tot} \otimes J^{-1} H_{tot})$ is the optimum line to have the fastest convergence toward the targeted principal axis of inertia.

In preferred implementations, the inertia flywheels 20 are therefore controlled so as to form an internal angular momentum $H_{act}$ whose line, throughout the duration of the step 52 of alignment with the principal axis of inertia, is not too far away from that of the vector $J^{-1}(H_{tot} \otimes J^{-1} H_{tot})$. More particularly, the inertia flywheels 20 are controlled such that the absolute value of the cosine of an angle θ between said internal angular momentum $H_{act}$ and the vector $J^{-1}(H_{tot} \otimes J^{-1} H_{tot})$ is, throughout the duration of the step 52 of alignment with the principal axis of inertia, greater than 0.9 (|cos θ|>0.9), or even greater than 0.98 (|cos θ|>0.98).

Preferably, the inertia flywheels 20 are controlled, throughout the duration of the step 52 of alignment with the principal axis of inertia, so as to form an internal angular momentum $H_{act}$ substantially of the same line as that of the vector $J^{-1}(H_{tot} \otimes J^{-1} H_{tot})$:

$$H_{act} = K_V U$$

expression in which $K_V$ is a scalar parameter and U corresponds to the line of the vector $J^{-1}(H_{tot} \otimes J^{-1} H_{tot})$:

$$U = \frac{J^{-1}(H_{tot} \otimes J^{-1} H_{tot})}{\|J^{-1}(H_{tot} \otimes J^{-1} H_{tot})\|}$$

The scalar parameter $K_V$ is either negative if the targeted principal axis of inertia is the axis of maximum inertia of the satellite 10, or positive if said targeted principal axis of inertia is the axis of minimum inertia of said satellite 10.

The scalar parameter $K_V$ is constant or variable over time, and its value is determined so as to ensure that the internal angular momentum $H_{act}$, to be formed during the step 52 of alignment with the principal axis of inertia, always complies with the maximum angular momentum and torque forming capacity of the inertia flywheels 20. For example, the value of the scalar parameter $K_V$ bears out the following expressions:

$$|K_V| \le \frac{Tmax}{\|\dot{U}\|}$$

$$|K_V| \le Hmax$$

expressions in which:
  Tmax corresponds to the maximum torque forming capacity of the inertia flywheels 20,
  $\dot{U}$ corresponds to the temporal drift of the line U of the vector $J^{-1}(H_{tot} \otimes J^{-1} H_{tot})$,
  Hmax corresponds to the maximum angular momentum forming capacity of the inertia flywheels 20.

The value of the parameter of the scalar parameter $K_V$ can also be limited when the line of the total angular momentum $H_{tot}$ approaches the principal axis of inertia. For example, when the angle φ between the line of the total angular momentum $H_{tot}$ and the principal axis of inertia becomes less than 15°, it is possible to apply a factor sin φ/sin(15°) which decreases progressively as the angle φ decreases.

Figure 2:
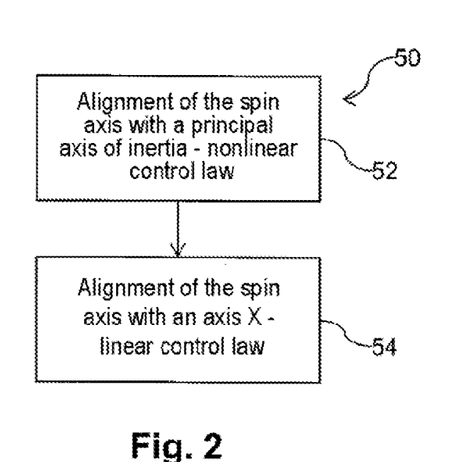
FIG. 2: a diagram illustrating the main steps of a particular implementation of an attitude control method.

FIG. 2 represents a preferred implementation of an attitude control method 50 for the satellite 10.

As illustrated by FIG. 2, the attitude control method 50 illustrated comprises, after the step 52 of alignment with the targeted principal axis of inertia (axis of maximum inertia or axis of minimum inertia), a step 54 of alignment of the kinetic axis with a predetermined axis X in the craft reference frame, during which a control law is used that is different from that used during the step 52 of alignment with the targeted principal axis of inertia, in this case a linear control law of proportional-integral type.

More particularly, during the step 54 of alignment with the axis X, the inertia flywheels 20 are controlled so as to lock the components of the internal angular momentum $H_{act}$ according to the axes Y, Z, transverse to the axis X and forming therewith a particular craft reference frame, on to setpoints respectively $h_Y$ and $h_Z$ determined as a function of the components of the inertial speed of rotation of the satellite 10 according to said axes Y, Z:
  the setpoint $h_Y$ of the internal angular momentum $H_{act}$ according to the axis Y is determined according to a control law of proportional-integral type from the component r of the speed of rotation according to the axis Z,
  the setpoint $h_Z$ of the internal angular momentum $H_{act}$ according to the axis Z is determined according to a control law of proportional-integral type from the component q of the speed of rotation according to the axis Y.

As illustrated by FIG. 2, the targeted axis X preferably coincides with the targeted principal axis of inertia, in which case the control law of proportional-integral type makes it possible to damp the mutation to a zero value about said targeted principal axis of inertia. However, the control law of proportional-integral type also makes it possible to ensure the convergence, from a kinetic axis substantially aligned with the targeted principal axis of inertia, toward an axis X distinct from said principal axis of inertia, and to damp the mutation to a zero value about said axis X. If necessary, the axis X should however be sufficiently close to the principal axis of inertia for the alignment of the kinetic axis with said axis X to be able to be performed by means of the inertia flywheels 20. The axis X can be considered to be close enough to the principal axis of inertia when the products of inertia $I_{XY}$ and $I_{XZ}$ with the axis X bear out the following expressions:

$$\frac{|I_{XY}| \cdot \|H_{tot}\|}{I_X} < \|Hmax\|$$

$$\frac{|I_{XZ}| \cdot \|H_{tot}\|}{I_X} < \|Hmax\|$$

expressions in which $I_X$ corresponds to the inertia according to the axis X. However, it is preferable to provide an additional margin to ensure that the alignment of the kinetic axis with said axis X can effectively be performed by means of the inertia flywheels 20:

$$\frac{|I_{XY}| \cdot \|H_{tot}\|}{I_X} < \frac{\|Hmax\|}{\rho}$$

$$\frac{|I_{XZ}| \cdot \|H_{tot}\|}{I_X} < \frac{\|Hmax\|}{\rho}$$

expressions in which $\rho$ corresponds to a predefined factor greater than one ($\rho>1$), for example equal to two ($\rho=2$).

In particular implementations, the setpoints $h_Y$ and $h_Z$ of the internal angular momentum $H_{act}$ according to the axes respectively Y and Z are linked to the components respectively r and q of the speed of rotation of the satellite 10 by the following transfer functions, expressed in the Laplace domain:

$$\begin{cases} h_Y = K_Z\left(1 + \frac{\omega_Z}{s}\right)r \\ h_Z = -K_Y\left(1 + \frac{\omega_Y}{s}\right)q \end{cases}$$

expressions in which:
 s is the Laplace variable,
 $K_Y$ and $K_Z$ are dimensionless scalar parameters of the same sign that are constant over time,
 $\omega_Y$ and $\omega_Z$ are positive scalar parameters, uniform with angular frequencies ($s^{-1}$), that are constant over time.

The use of the Laplace domain in the domain of the automatic control systems is perfectly conventional and considered to be known to a person skilled in the art. Furthermore, the adjustment of the scalar parameters $K_Y$, $K_Z$, $\omega_Y$ and $\omega_Z$, given the above expressions of the setpoints $h_Y$ and $h_Z$ of the internal angular momentum $H_{act}$, is considered to be within the reach of a person skilled in the art.

As indicated previously, the attitude control method 50 makes it possible to align the kinetic axis with a principal axis of inertia (axis of maximum inertia or axis of minimum inertia) regardless of the angular momentum and torque forming capacity of the inertia flywheels 20 of the satellite 10.

Consequently, the step 52 of alignment of the kinetic axis with the targeted principal axis of inertia can be executed before any modification of the total angular momentum $H_{tot}$ in inertial reference frame. Similarly, the step 54 of alignment of the kinetic axis with an axis X coinciding with the targeted principal axis of inertia or close thereto, can also be executed before any modification of the total angular momentum $H_{tot}$ in inertial reference frame. There is however nothing to preclude, according to other examples, modifying the total angular momentum $H_{tot}$ before and/or during the alignment of the kinetic axis with a predetermined axis in the craft reference frame.

Figure 3:
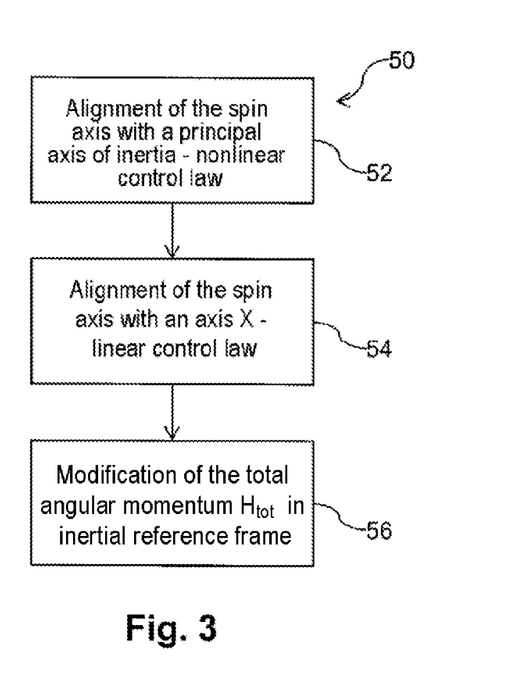
FIG. 3: a diagram illustrating the main steps of a preferred implementation of an attitude control method.

FIG. 3 represents a preferred implementation of an attitude control method 50 for the satellite 10. As illustrated by FIG. 3, the attitude control method 50 comprises, after the step 52 of alignment with the targeted principal axis of inertia, a step 56 of modification of the total angular momentum $H_{tot}$ in inertial reference frame by means of thrusters (not represented in the Figures) of the satellite 10, controlled by the control device 30. The step 56 of modification of the total angular momentum $H_{tot}$ by means of thrusters of the satellite 10 is conventional and is considered to be known to a person skilled in the art. For example, the step 56 of modification of the total angular momentum $H_{tot}$ can comprise the reduction of said total angular momentum $H_{tot}$ until it is within the absorption capacity of the inertia flyw heels 20.

In the nonlimiting example illustrated by FIG. 3, the attitude control method 50 also comprises the step 54 of alignment with an axis X, which implements a linear control law to damp the mutation, which is for example also executed before the step 56 of modification of the total angular momentum $H_{tot}$ in inertial reference frame. In the example illustrated by FIG. 3, the axis X is considered to coincide with the targeted principal axis of inertia.

Preferably, the thrusters used during the step 56 of modification of the total angular momentum $H_{tot}$ are electric thrusters. Advantageously, the targeted principal axis of inertia (or, if appropriate, the targeted axis X) is an axis according to which the satellite 10 can ensure its electrical autonomy by means of solar generators (not represented in the Figures), such that it is possible to use electric thrusters to modify the total angular momentum $H_{tot}$ in inertial reference frame.

Hereinafter in the description, the case where the solar generators of the satellite 10 are rotationally mobile about an axis of rotation substantially orthogonal to the axis of maximum inertia of said satellite 10 is taken as a nonlimiting example (this will generally be the case if the solar generators are arranged on either side of a body of said satellite 10). The orientation of said solar generators about the axis of rotation is controlled by means of drive mechanisms. In this case, the principal axis of inertia targeted during the step 52 of alignment (and, if appropriate, the axis X targeted during the step 54 of alignment) corresponds to the axis of maximum inertia of said satellite 10. At the end of this step, the kinetic axis is therefore substantially orthogonal to the axis of rotation of the solar generators. It can be demonstrated that it is then always possible to find an orientation of the solar generators that makes it possible to ensure that the average insolation of photosensitive surfaces of said solar generators, over the duration of a complete rotation of the satellite 10 on itself, is greater than a predefined threshold value, for example greater than 30%. By placing the solar generators in such an orientation, it is then possible to ensure the electrical autonomy of the satellite 10, such that electric thrusters can be implemented to modify the total angular momentum $H_{tot}$ of the satellite 10.

The above description clearly illustrates that, through its different features and the advantages thereof, the present invention achieves the objectives that were set for it. In particular, the invention makes it possible to modify the orientation of a satellite 10 in relation to a kinetic axis by means solely of inertia flywheels 20, including when the initial total angular momentum $H_{tot}$ is greater than the absorption capacity of said inertia flywheels 20, using a nonlinear control law.

Figure 4:
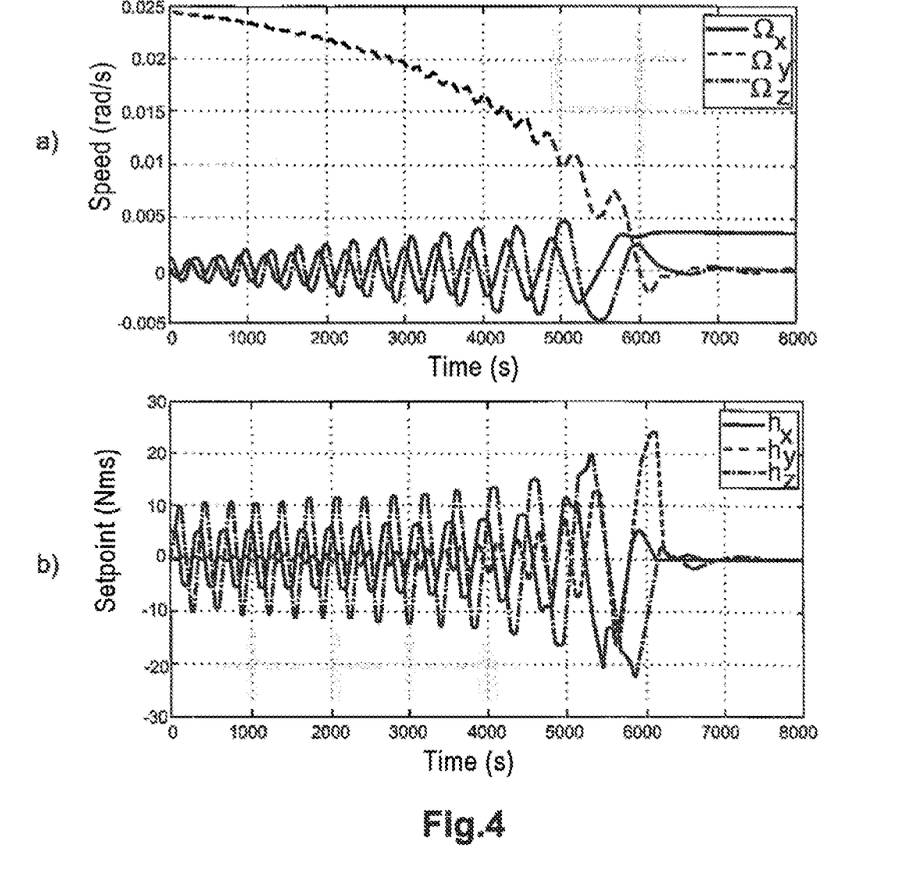
FIG. 4: curves illustrating the performance levels of an attitude control method according to the invention.

FIG. 4 represents simulation results illustrating the performance levels of an attitude control method 50 according to the invention during the step 52 of alignment of the axis of the total angular momentum $H_{tot}$ with the principal axis of inertia of a satellite 10. The inertias for the satellite 10 considered are as follows:

$I_X$=70 000 kg·m²,
$I_Y$=10 000 kg·m²,
$I_Z$=50 000 kg·m².

such that the principal axis of inertia of said satellite 10 is substantially the axis X.

Furthermore, the maximum angular momentum capacity Hmax of the inertia flywheels 20 of the satellite 10 considered is equal to 25 N·m·s, and the maximum torque capacity Tmax is equal to 0.2 N·m.

The part a) of FIG. 4 represents the speeds of rotation $\Omega_X$, $\Omega_Y$, $\Omega_Z$ (expressed in rad/s) of the satellite 10. It can be seen that the initial total angular momentum $H_{tot}$ is close to the axis Y. Furthermore, the initial total angular momentum $H_{tot}$ considered is 250 N·m·s, such that it is very much greater than the maximum angular momentum capacity Hmax of the inertia flywheels 20 of the satellite 10.

The part b) of FIG. 4 represents the setpoints $h_X$, $h_Y$, $h_Z$ of the internal angular momentum $H_{act}$ during the step 52 of alignment.

As illustrated by the part a) of FIG. 4, the axis of the total angular momentum $H_{tot}$ clearly converges toward the axis X of the satellite 10, and without the internal angular momentum $H_{act}$ exceeding the maximum angular momentum forming capacity Hmax of the inertia flywheels 20 of the satellite 10, as the part b) of FIG. 4 shows.

The invention claimed is:

1. An attitude control method for a spacecraft rotating on itself with a non-zero total angular momentum $H_{tot}$, the spacecraft comprising a set of inertia flywheels configured to form an internal angular momentum $H_{act}$ of any axis in a craft reference frame, the method comprising steps of:
   aligning an axis of the total angular momentum $H_{tot}$ with a principal axis of inertia of the spacecraft;
   controlling the inertia flywheels, during the aligning step, so as to form an internal angular momentum $H_{act}$ such that a following expression:

$H_{act} \times J^{-1}(H_{tot} \otimes J^{-1} H_{tot})$ is negative throughout the duration of the aligning step if a targeted principal axis of inertia is an axis of maximum inertia of the spacecraft, and is positive throughout the duration of the aligning step if the targeted principal axis of inertia is an axis of minimum inertia of the spacecraft;
   wherein J in the expression is an inertia matrix of the spacecraft, an operator × is a scalar product between two vectors and an operator is a vector product between two vectors; and
   wherein the inertia flywheels are controlled so as to form the internal angular momentum $H_{act}$ for which an angle θ between the internal angular momentum $H_{act}$ and the vector $J^{-1}(H_{tot} \otimes J^{-1} H_{tot})$ bears out, throughout the duration of the aligning step, a following expression: $|\cos θ| > 0.9$.

2. The method as claimed in claim 1, wherein the inertia flywheels are controlled, throughout the duration of the step of aligning the principal axis of inertia, so as to form the internal angular momentum $H_{act}$:

$H_{act} K_V U$

Expression wherein $K_V$ is a scalar parameter that is negative if the targeted principal axis of inertia is the axis of maximum inertia of the spacecraft or is positive if the targeted principal axis of inertia is the axis of minimum inertia of the spacecraft, and U corresponds to a unitary vector:

$$U = \frac{J^{-1}(H_{tot} \otimes J^{-1} H_{tot})}{\|J^{-1}(H_{tot} \otimes J^{-1} H_{tot})\|}.$$

3. The method as claimed in claim 2, wherein the step of aligning the principal axis of inertia is executed with the total angular momentum $H_{tot}$ that is constant in an inertial reference frame.

4. The method as claimed in claim 2, further comprising, after the step of aligning the principal axis of inertia, a step of modifying the total angular momentum $H_{tot}$ in an inertial reference frame by utilizing thrusters of the spacecraft.

5. The method as claimed in claim 1, further comprising, after the step of aligning with the principal axis of inertia, a step of aligning a predetermined axis X in the craft reference frame, during which the inertia flywheels are controlled so as to lock components of the internal angular momentum $H_{act}$ according to the axes Y, Z, transverse to the axis X, on to setpoints respectively $h_Y$ and $h_Z$ determined as a function of components of a speed of rotation of the spacecraft according to the axes Y, Z;
   wherein the setpoint $h_Y$ of the internal angular momentum $H_{act}$ according to the axis Y is determined according to a control law of proportional-integral type from a component r of the speed of rotation according to the axis Z; and
   wherein the setpoint $h_Z$ of the internal angular momentum $H_{act}$ according to the axis Z is determined according to the control law of proportional-integral type from a component q of the speed of rotation according to the axis Y.

6. The method as claimed in claim 5, wherein the setpoints $h_Y$ and $h_Z$ of the internal angular momentum $H_{act}$ according to the axes Y and Z, respectively, are linked to the components r and q, respectively, of the speed of rotation by a following transfer functions, expressed in a Laplace domain:

$$\begin{cases} h_Y = K_Z\left(1 + \frac{\omega_Z}{s}\right) r \\ h_Z = -K_Y\left(1 + \frac{\omega_Y}{s}\right) q \end{cases}$$

wherein s is a Laplace variable, $K_Y$ and $K_Z$ are scalar parameters of a same sign that are constant over time, $\omega_Y$ and $\omega_Z$ are positive scalar parameters that are constant over time.

7. The method as claimed in claim 6, wherein the step of aligning the predetermined axis X is executed with the total angular momentum $H_{tot}$ that is constant in an inertial reference frame.

8. The method as claimed in claim 5, wherein the step of aligning the predetermined axis X is executed with the total angular momentum $H_{tot}$ that is constant in an inertial reference frame.

9. The method as claimed in claim 5, wherein the inertia flywheels are controlled, throughout the duration of the step of aligning the principal axis of inertia, so as to form the internal angular momentum $H_{act}$:

$$H_{act} = K_V U$$

expression wherein $K_V$ is a scalar parameter that is negative if the targeted principal axis of inertia is the axis of maximum inertia of the spacecraft or is positive if the targeted principal axis of inertia is the axis of minimum inertia of the spacecraft, and U corresponds to a unitary vector:

$$U = \frac{J^{-1}(H_{tot} \otimes J^{-1}H_{tot})}{\|J^{-1}(H_{tot} \otimes J^{-1}H_{tot})\|}.$$

10. The method as claimed in claim 1, wherein the step of aligning the principal axis of inertia is executed with total angular momentum $H_{tot}$ that is constant in an inertial reference frame.

11. The method as claimed in claim 1, further comprising, after the step of aligning the principal axis of inertia, a step of modifying the total angular momentum $H_{tot}$ in an inertial reference frame by utilizing thrusters of the spacecraft.

12. A computer program product recorded on a non-transitory media comprising a set of program code instructions executable by a processor to perform the steps of the attitude control method as claimed in claim 1.

13. An attitude control system for a spacecraft rotating on itself with a non-zero total angular momentum $H_{tot}$, the spacecraft comprising a set of inertia flywheels configured to form an internal angular momentum $H_{act}$ of any axis in a craft reference frame, and comprising at least one processor and at least one electronic memory to perform the steps of the method as claimed in claim 1 to control the inertia flywheels.

14. An attitude control system for a spacecraft rotating on itself with a non-zero total angular momentum $H_{tot}$, the spacecraft comprising a set of inertia flywheels configured to form an internal angular momentum $H_{act}$ of any axis in a craft reference frame, and comprising at least one programmable logic circuit to perform the steps of the method as claimed in claim 1 to control the inertia flywheels.

* * * * *